United States Patent [19]
Younger

[11] Patent Number: 6,117,047
[45] Date of Patent: Sep. 12, 2000

[54] METHOD AND SYSTEMS FOR IMPROVING THE OPERATION OF TRANSMISSIONS FOR MOTOR VEHICLES

[76] Inventor: Gilbert W. Younger, 2621 Merced Ave., El Monte, Calif. 91733

[21] Appl. No.: 09/227,479

[22] Filed: Jan. 8, 1999

[51] Int. Cl.$^7$ .............................. F16H 61/26; F16H 31/00
[52] U.S. Cl. ............................................ 477/130; 475/120
[58] Field of Search ......................... 74/606 R; 475/116, 475/120, 127; 477/156, 130, 127

[56] References Cited

U.S. PATENT DOCUMENTS

| | | | |
|---|---|---|---|
| 3,773,083 | 11/1973 | Hague et al. | 137/625.69 |
| 4,347,765 | 9/1982 | Leaonard et al. | 477/150 |
| 4,449,426 | 5/1984 | Younger . | |
| 4,711,140 | 12/1987 | Younger . | |
| 4,790,938 | 12/1988 | Younger . | |
| 4,886,321 | 12/1989 | De La Broise et al. | 60/591 X |
| 5,253,549 | 10/1993 | Younger . | |
| 5,289,844 | 3/1994 | Stevenson | 137/343 |
| 5,458,540 | 10/1995 | Moan et al. | 474/28 |
| 5,540,628 | 7/1996 | Younger . | |
| 5,624,342 | 4/1997 | Younger . | |
| 5,626,533 | 5/1997 | Jang | 477/130 X |
| 5,730,685 | 3/1998 | Younger . | |
| 5,743,823 | 4/1998 | Younger . | |
| 5,768,953 | 6/1998 | Younger . | |
| 5,820,507 | 10/1998 | Younger . | |
| 5,967,928 | 10/1999 | Younger . | |

*Primary Examiner*—Charles A Marmor
*Assistant Examiner*—Roger Pang
*Attorney, Agent, or Firm*—Mark P. Stone

[57] ABSTRACT

The present invention is directed to methods and systems for improving the operation of transmissions for automotive vehicles, and in particular, the "factory installed" automotive transmission as installed by an original automobile manufacturer. The methods and systems of the present invention modify both the structural components and hydraulic circuitry of original transmissions to adjust applied pressure and shifting patterns to enhance the operation of the modified transmissions.

17 Claims, 11 Drawing Sheets

METHOD AND SYSTEMS FOR IMPROVING THE OPERATION OF TRANSMISSIONS FOR MOTOR VEHICLES

BACKGROUND OF THE INVENTION

The methods and systems of the present invention are directed to the modification and improvement of transmissions for automotive vehicles, more commonly referred to as "factory installed" transmissions, installed in an automotive vehicle by an original automobile manufacturer. The present invention is more particularly directed to "factory installed" transmissions identified as Model Nos. 4L60E and 4T60E, installed in vehicles manufactured by General Motors Corporation, Detroit, Mich., and Model No. CD-4E installed in vehicles manufactured by The Ford Motor Company of Dearborn, Mich. The components and operation of these three "factory installed" automotive transmissions are disclosed in the following publications, each of which is expressly incorporated by reference into the present patent application: *Hydra-Matic 4T60-E Technician's Guide*, General Motors Corporation, Hydra-Matic Division, Second Edition, January 1991; *Hydra-Matic 4L60-E Technician's Guide*, General Motors Corporation, Power Train Division, 1992; and *CD4E Automatic Transaxle Theory/Operation Reference Manual*, Ford Motor Company, 1993.

The present inventor owns the following United States Patents, each of which is also expressly incorporated by reference into the present patent application: U.S. Pat. No. 4,449,426, issued May 22, 1984; U.S. Pat. No. 4,711,140, issued Dec. 8, 1987; U.S. Pat. No. 4,790,938, issued Dec. 13, 1988; U.S. Pat. No. 5,253,549, issued Oct. 19, 1993; U.S. Pat. No. 5,540,628, issued Jul. 30, 1996; U.S. Pat. No. 5,624,342, issued Apr. 29, 1997; U.S. Pat. No. 5,730,685, issued Mar. 24, 1998; U.S. Pat. No. 5,743,823, issued Apr. 28, 1998; U.S. Pat. No. 5,768,953, issued Jun. 23, 1998; U.S. Pat. No. 5,820,507, issued Oct. 7, 1998; and U.S. Pat. No. 5,967,928, issued Oct. 19, 1999.

In the factory installed CD-4E transmission, Applicant has recognized that the arrangement of the main regulator valve, and the flow of fluid therethrough, can result in unregulated pressure applied to the valve resulting in an increase in line pressure exceeding the design limits. The excess pressure causes the valve to move in a direction which impedes fluid flow to the converter and cooler, resulting in potential damage to components of the system as a result of the overpressure, and overheating of the converter as a result of the disruption of the fluid flow to the cooler.

The factory installed 4T60-E transmission includes an isolator valve having a relative small length/diameter ratio resulting in potential misalignment of the valve which accelerates wear in the bore in which the valve reciprocates. The worn bore is likely to cause fluid leaks, adversely affecting operation of the valve and the overall hydraulic circuit of the transmission.

The factory installed 4L60-E transmission also has an isolator valve which has a relatively small length/diameter ratio. As discussed above with respect to the 4T60-E transmission, this isolator valve tends to tip, thereby accelerating wear of the bore in which it reciprocates, causing fluid leaks which adversely affect the operation of the hydraulic circuitry of the factory installed transmission.

It is the primary object of the present invention to overcome the known disadvantages of the CD-4E, 4T60-E and 4L60-E automotive transmissions by modifying components and/or the arrangement of hydraulic circuitry in the respective factory installed transmissions. Other objects and advantages of the present invention will become apparent to those skilled in the art from the following discussion.

SUMMARY OF THE INVENTION

In a first aspect of the present invention, a factory installed CD-4E transmission is modified by adjusting the diameter of transmission fluid lines at predetermined locations within the hydraulic circuitry for reducing excess fluid pressure at the main regulator valve for preventing line pressure from increasing above a predetermined limit, and for preventing undesired movement of the valve in a direction adversely affecting operation of the transmission. Additionally, the end plug of the factory installed main regulator valve is replaced by a new relief valve assembly to further regulate line pressure and prevent it from exceeding the predetermined value.

In a further aspect of the present invention, a factory installed 4T60-E transmission is modified to replace the original isolator valve, having a relatively small length/diameter ratio, with a new isolator valve having a significantly larger length/diameter ratio. The hydraulic circuitry of the factory installed transmission is modified by blocking fluid flow between a PWM (pulse width modulation) solenoid and the isolator valve, and providing a new hydraulic circuit coupling the isolator valve to a modulator circuit of the factory installed installed transmission.

In a further aspect of the present invention, a factory installed 4L60-E transmission is modified by replacing the original isolator valve, which has a relatively small length diameter ratio with a new isolator valve having a significantly greater length/diameter ratio. The hydraulic circuitry of the factory installed transmission is modified to prevent fluid flow between the isolator valve and a PWM solenoid, and a new circuit is provided for coupling the torque signal oil line to the new isolator valve.

DESCRIPTION OF THE BEST MODES FOR CARRYING OUT THE INVENTION

Referring first to FIGS. 1–4 of the drawings, the main regulator valve of a factory installed CD-4E transmission is generally designated by reference numeral 2. The regulator valve includes a TV (throttle valve) cavity designated by reference numeral 4, a main regulator spring 6 disposed in the cavity 4, and an end plug 8 engaging the remote end of the spring 6 proximate to the right end of the valve as seen in FIG. 1A. The valve includes a first larger land 10 and a second smaller land 12. In operation, fluid pressure is applied to the valve through the passageway designated LP (line pressure) and at the position designated by LPB (line pressure balance). The fluid pressure applied at LPB causes the valve to move in a rightward direction a seen in FIG. 1A to permit fluid entering the valve at passageway LP to exit the valve through passageway LPX (line pressure exhaust). However, some of this fluid will flow past the land 10 and into the cavity 4. Normal wear of the land 10 as it reciprocates in its bore increases the quantity of fluid entering the cavity 4. Orifices designated by reference numerals 14 and 16, are provided in the TV (throttle valve) line designated by reference numeral 18 for coupling the throttle valve cavity 4 to an electronic pressure control solenoid (EPC) designated by reference numeral 20. However, the size of the orifices 14 and 16, which correspond to the diameter of the TV line 18 at the location of the orifices, is not sufficiently large to provide adequate flow of excess fluid in the cavity 4 to the solenoid 20 for exhausting the excess fluid in the cavity 4. As a result of the excess fluid in the cavity 4, fluid pressure is applied to the land 10 causing it to move in a leftward direction as seen in FIG. 1A, resulting in a further increase in line pressure capable of exceeding the design limits of the transmission. Moreover, movement of the valve in a leftward direction as seen in FIG. 1A blocks the passageway LPX which interferes with fluid flow to the converter, cooler and lubrication systems. As a result of the unregulated pressure in the cavity 4 and the obstruction of the LPX passageway caused by the leftward movement of the valve, components of the transmission are likely to become damaged, and further damage is likely to result from overheating of the converter as a result of reduction or obstruction of the flow of coolant and lubricant fluid.

In accordance with the present invention, the orifices (line diameter) 14 and 16 of the factory installed transmission, which is approximately 0.039 inches, is increased to approximately 0.047 inches to permit sufficient fluid from the the cavity 4, through the TV line 18, to the electronic pressure control solenoid (EPC) 20 for exhausting a sufficient quantity of fluid from the cavity 4 to prevent unregulated pressure buildup therein, thereby preventing undesired movement of the valve in a leftward direction as seen in FIG. 1. Similarly, the orifice (line diameter) 22 of the TV line 18 proximate to the location at which line 18 is coupled to the electronic pressure control solenoid (EPC) 20 is increased from the factory installed diameter of approximately 0.039 inches to approximately 0.047 inches. In this manner, adequate flow of excess fluid from the cavity 4 of the main regulator valve 2 is exhausted through the TV line 18 to the EPC solenoid 20 for controlling the fluid pressure in the cavity 4 to prevent excessive pressure causing undesired movement of the regulator valve 2.

Figure 1A:
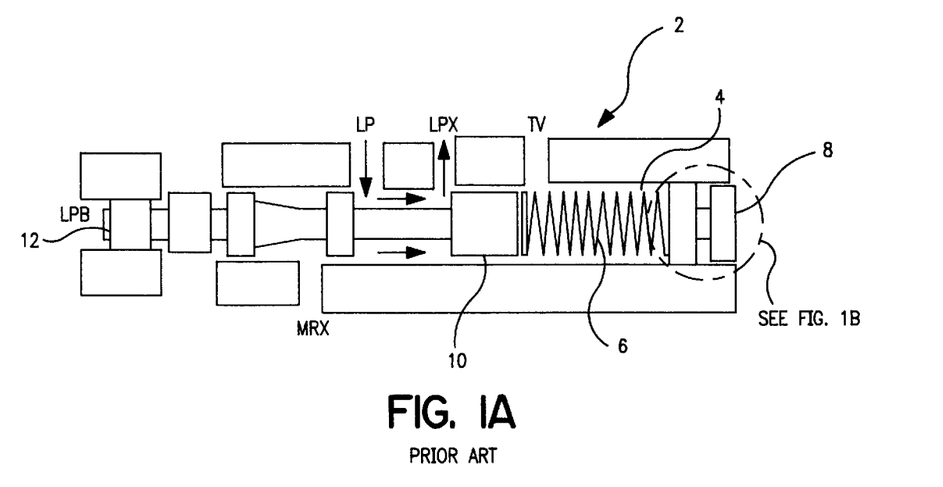
FIG. 1A illustrates the main regulator valve of a factory installed CD-4E transmission.
Figure 1B:
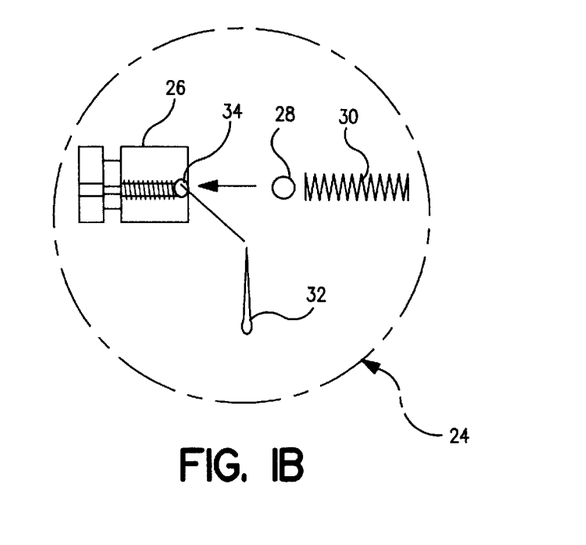
FIG. 1B illustrates a new relief valve assembly in accordance with the present invention.
Figure 2:
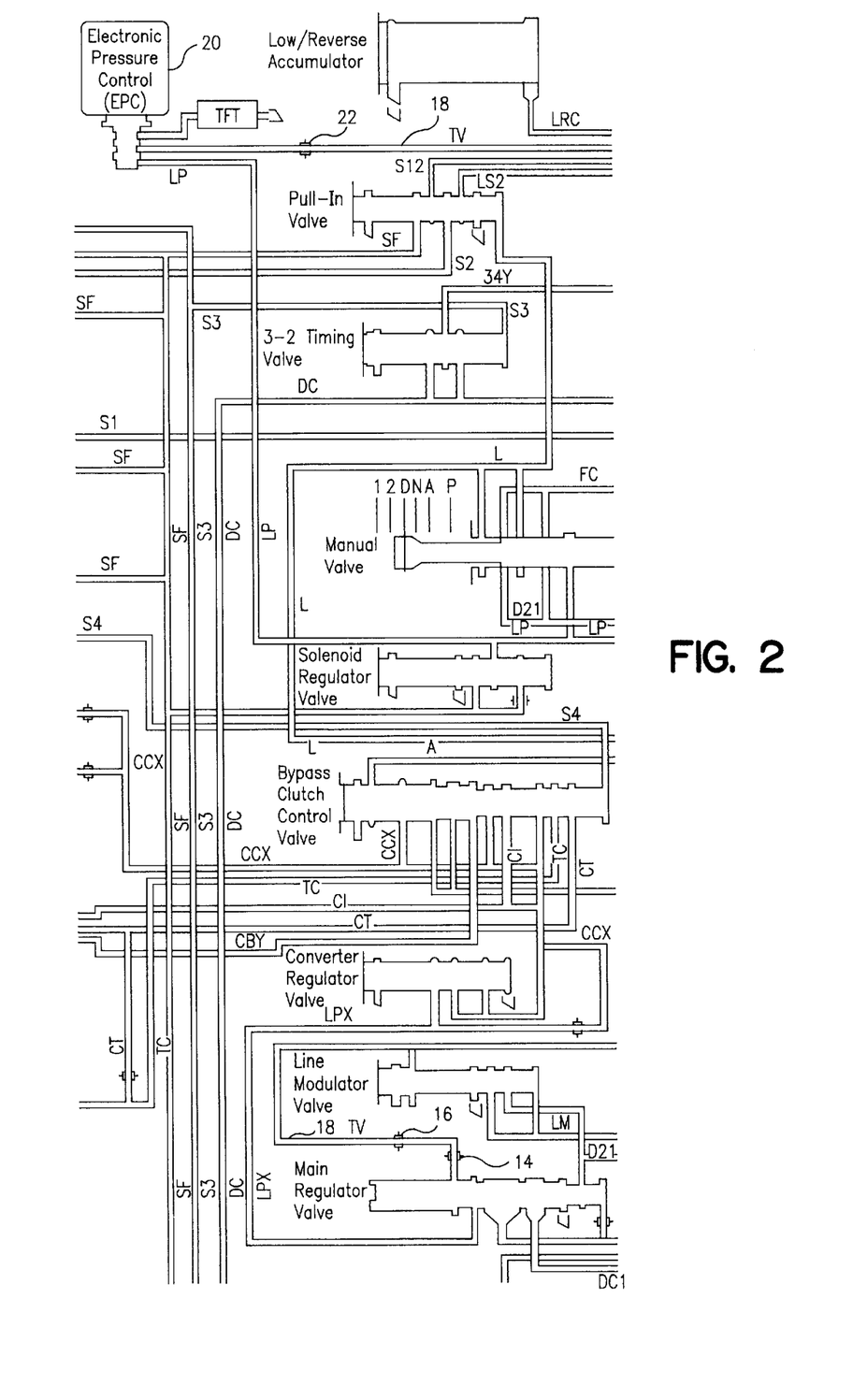
FIG. 2 illustrates modifications to the hydraulic circuitry of a factory installed CD-4E transmission in accordance with the present invention.
Figure 3:
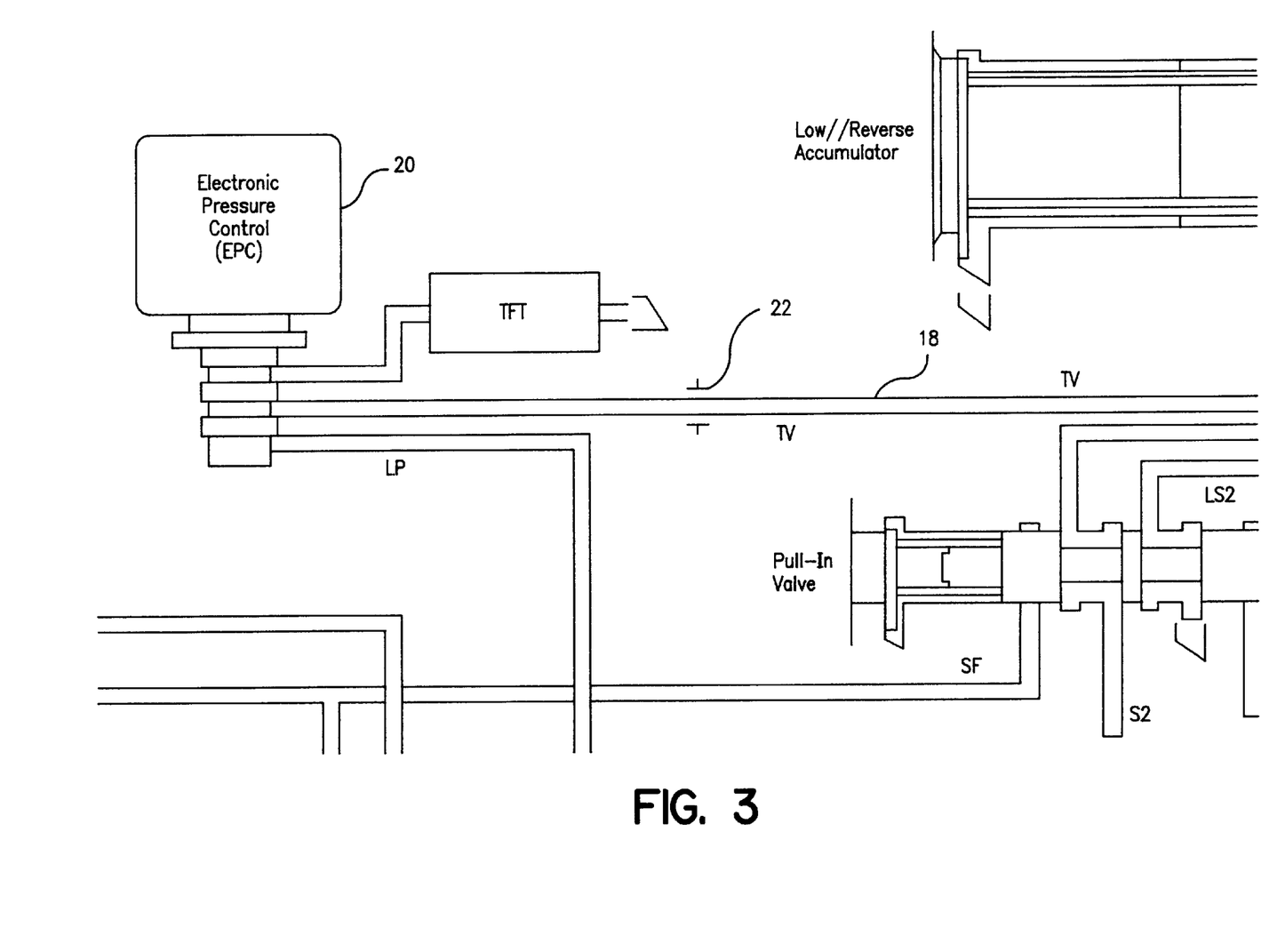
FIG. 3 illustrates in detail a first portion of the hydraulic circuitry illustrated by FIG. 2.
Figure 4:
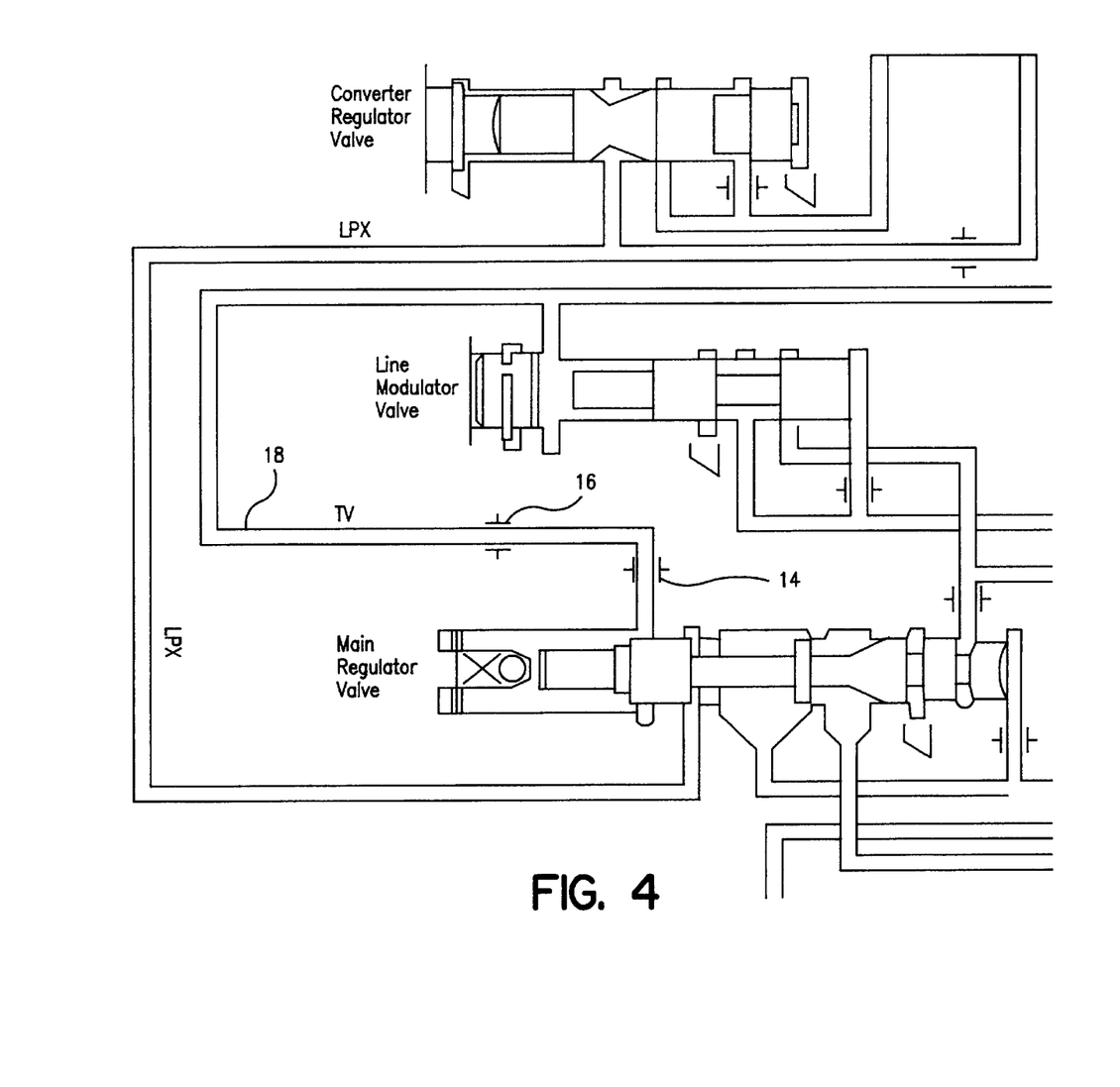
FIG. 4 illustrates in detail a second portion of the hydraulic circuitry illustrated by FIG. 2.

Referring to FIG. 1B, a new throttle valve relief valve assembly in accordance with the present invention is provided to replace the end plug 8 of the factory installed transmission. The TV relief valve assembly, generally designated by reference numeral 24, limits the throttle valve fluid pressure in the cavity 4. The relief valve assembly is formed from a bushing 26 having a hollow portion for receiving a ball 28 and a spring 30. A cotter pin 32 is removably received within an opening 34 defined proximate to the opened end of the hollow section of the bushing for removably retaing the ball 28 and spring 30 therein.

Figure 5:
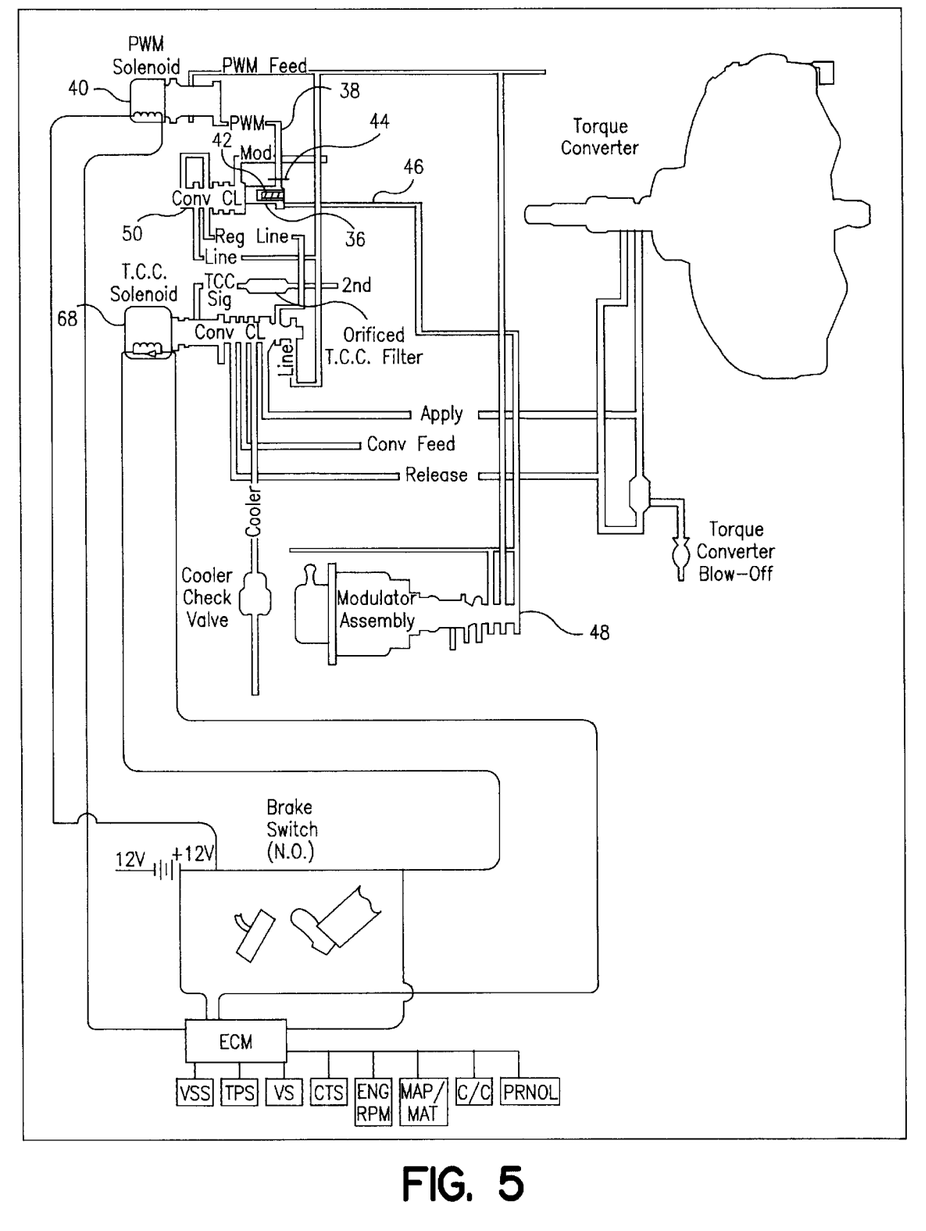
FIG. 5 illustrates the hydraulic circuitry of a factory installed 4T60-E transmission, as modified in accordance with the present invention.
Figure 6:
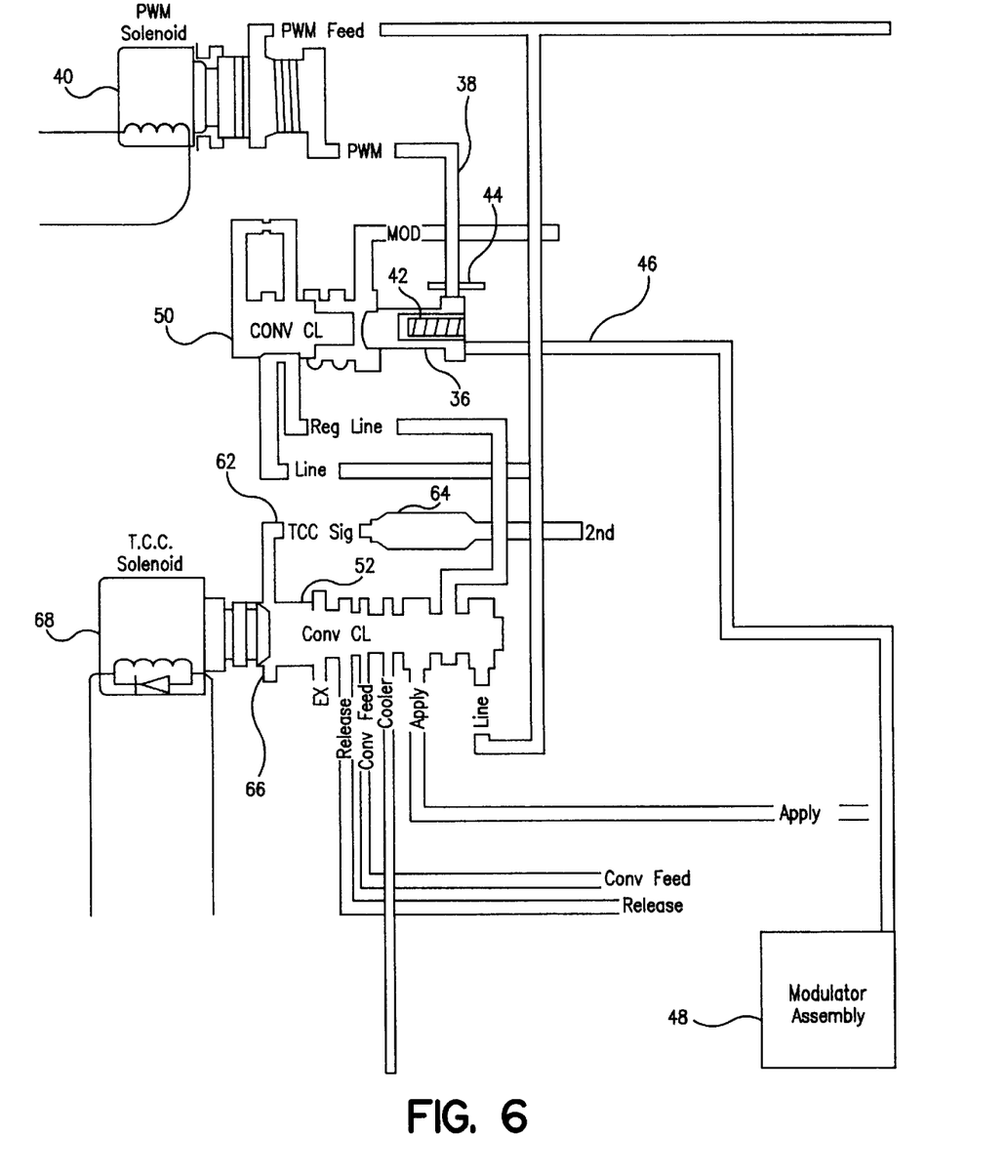
FIG. 6 illustrates a detailed section of the hydraulic circuitry illustrated by FIG. 5.
Figure 7A:
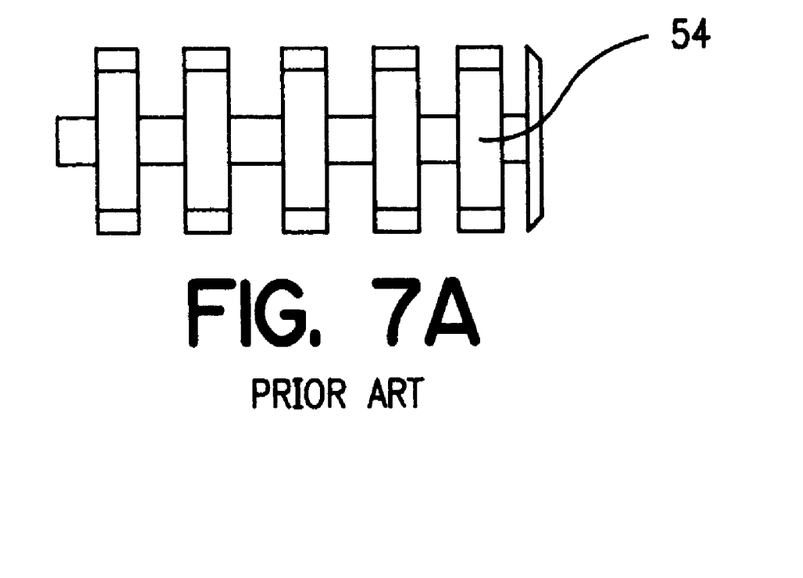
FIG. 7A illustrates a regulator valve of a factory installed 4T60-E transmission.
Figure 7B:
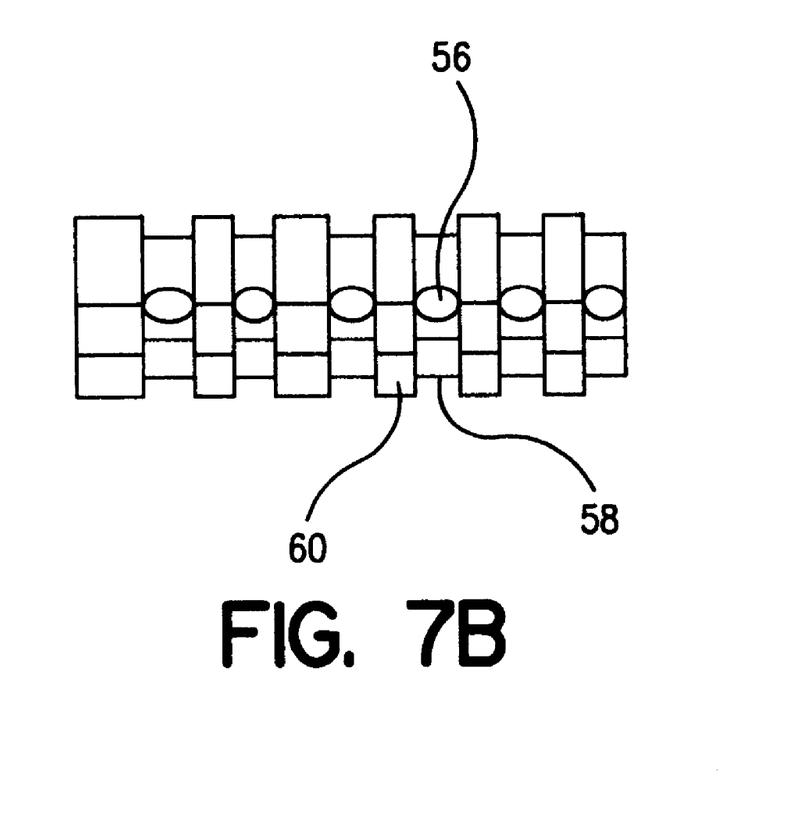
FIG. 7B illustrates an improved regulator valve in accordance with the present invention.
Figure 8A:
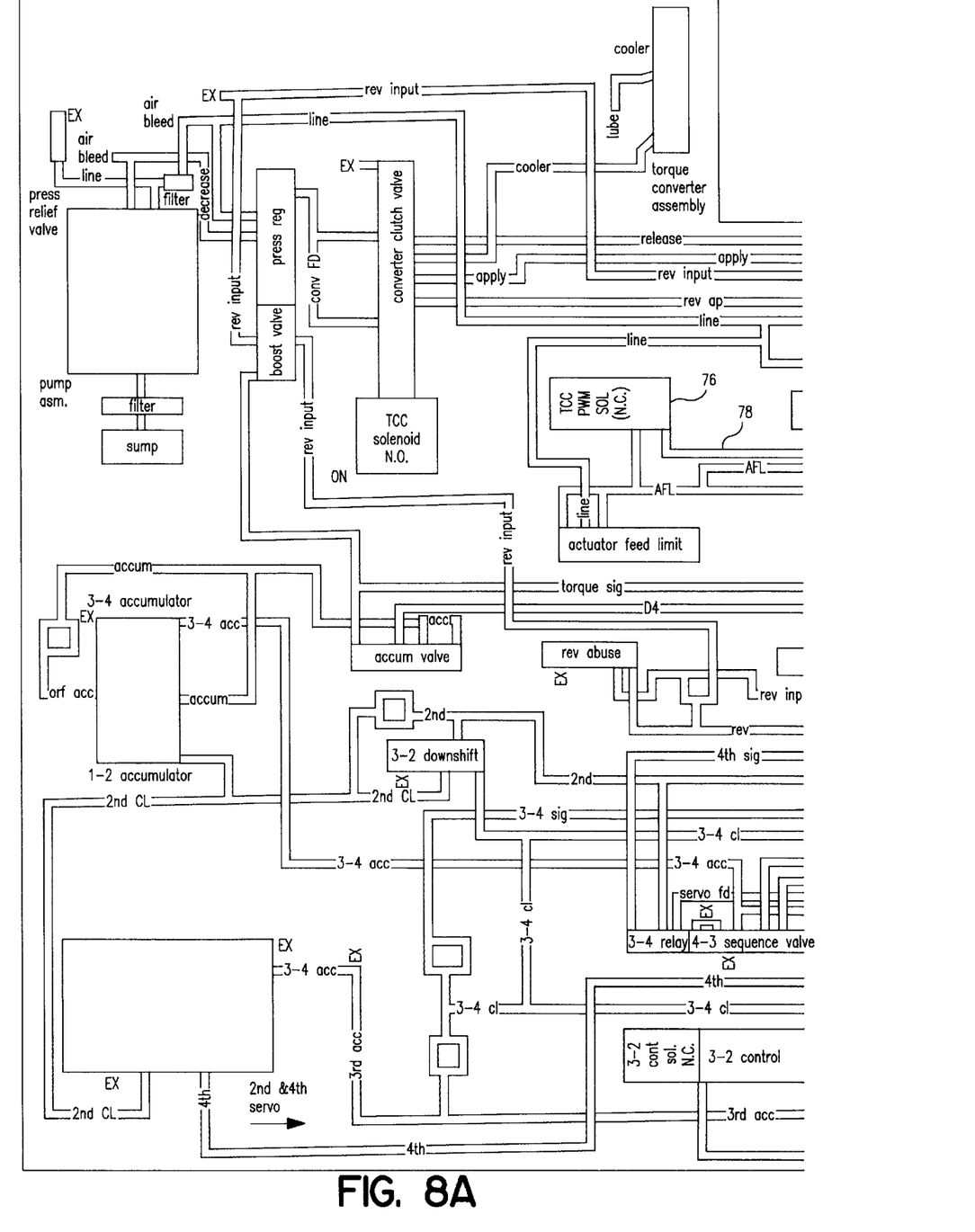
FIGS. 8A, 8B and 8C illustrate the hydraulic circuitry of a factory installed 4L60-E transmission as modified in accordance with the present invention.
Figure 8B:
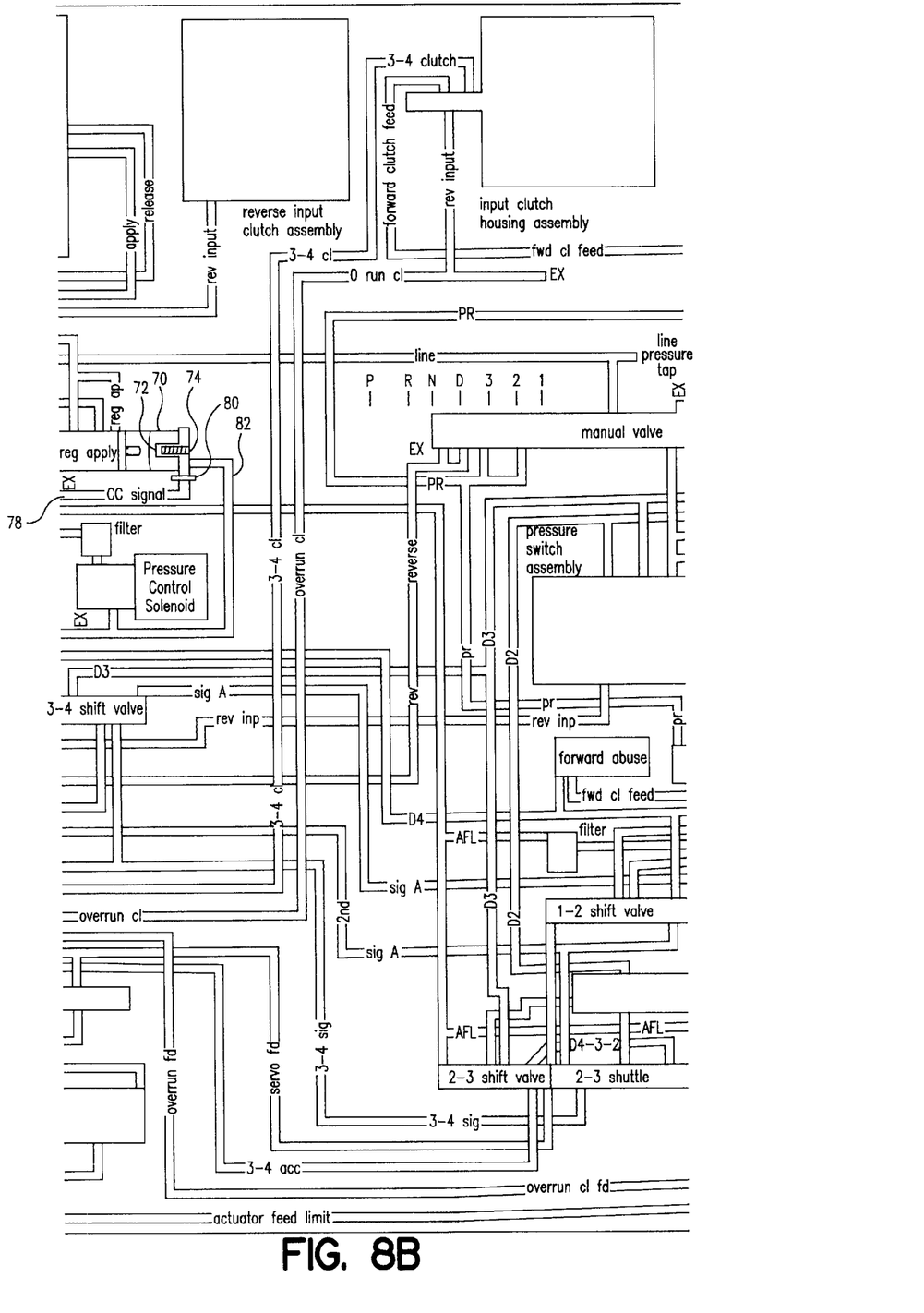
Figure 8C:
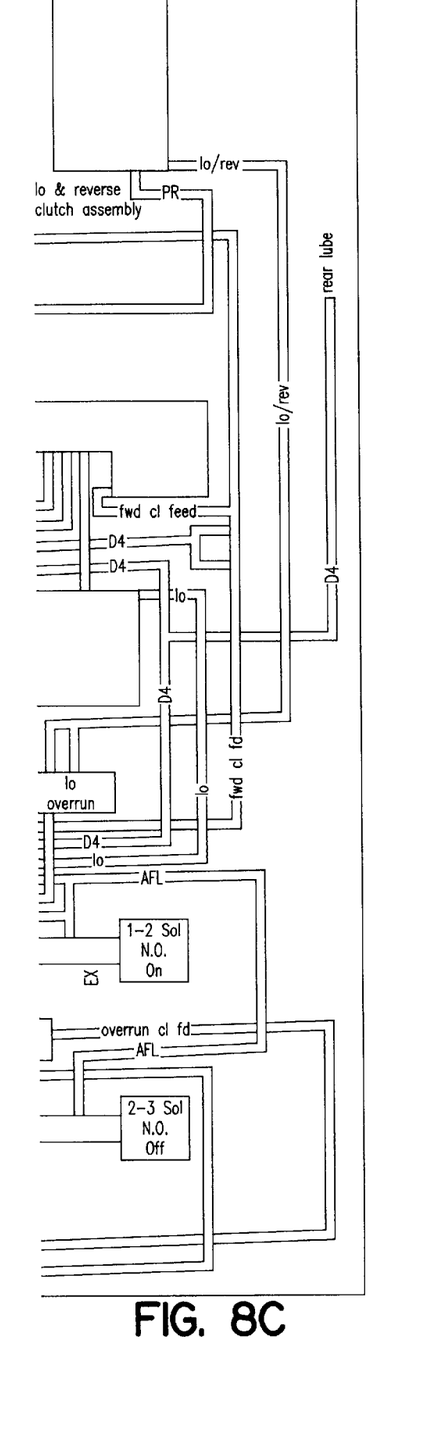
Figure 9:
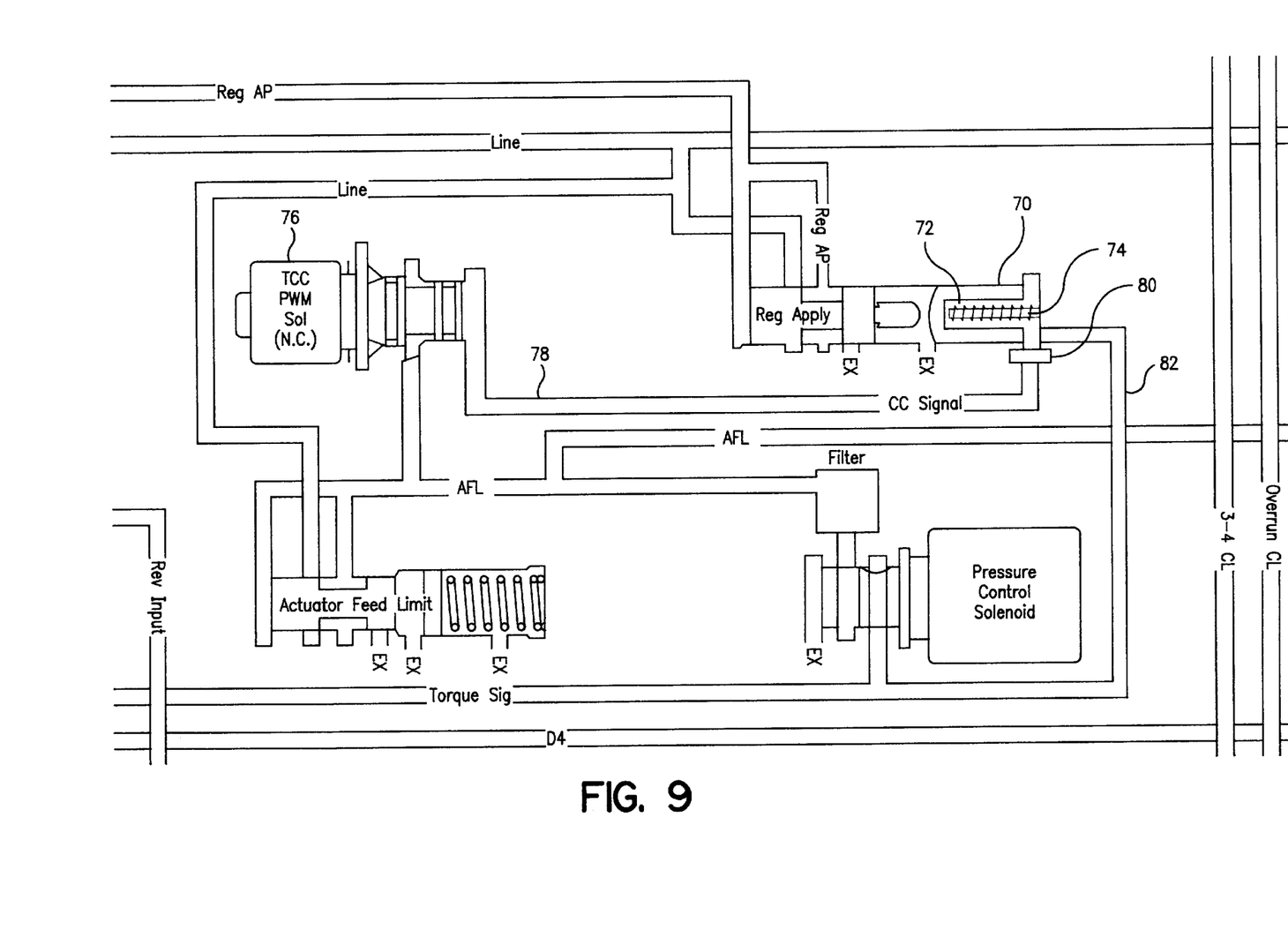
FIG. 9 illustrates a detailed section of the hydraulic circuitry illustrated by FIG. 8.

Referring now to FIGS. 5–7, these drawings illustrate modifications to a factory installed 4T60-E transmission in accordance with a further aspect of the present invention. In the factory installed transmission, the PWM (pulse width modulator) converter clutch apply system includes a PWM solenoid valve which is actuated and de-actuated via a computer which selectively transmits electrical current signals to switch the solenoid on and off for opening and closing the valve. The pulsing electrical current causes the valve to open and close, allowing fluid to pulsingly flow to an isolator valve which also pulses and moves due to fluid pressure to open and control fluid flow through a converter clutch regulator valve, and thereafter to control fluid flow from the converter clutch valve to an apply circuit in a torque converter. The pulse signal and the resulting pulsating fluid increases or decreases incrementally as a result of computer commands to match engine torque and to deliver a smooth lockup apply.

Referring to FIGS. 5–6, an isolator valve is designated generally by reference numeral 36. Pulsating fluid is applied to the right end of the valve 36 as shown in FIG. 6, and the left end of the valve 36 is opened to exhaust. In the factory installed transmission, the isolator valve 36 has a relatively small ratio of length to diameter of approximately 1.3. As a result, the valve is likely to become misaligned as it oscillates as a result of the pulsating fluid applied to it through the PWM (pulse width modulation) line 38 coupling the valve 36 to the PWM (pulse width modulation) solenoid 40. The misaligned valve 36 causes wear to the bore in which it reciprocates, and the worn bore causes fluid applied to the valve 36 through line 38 to leak through the valve 36. As a result of the leakage of fluid, the computer commanded apply rate is not accurately transferred to the regulator valve, which will not have sufficient fluid flow to match engine torque or the proper time rate of apply. The result is malfunction of the converter clutch with potential damage to the converter clutch friction material, loss of lock up function, overheating and potentially total malfunction of the transmission system.

In accordance with a further aspect of the present invention, the factory installed isolator valve 36 is replaced by an isolator valve having a significantly greater length/diameter ratio, preferably 2.9 which is over twice that of the factory installed valve. In this manner, the problem of misalignment of the isolator valve as it rapidly reciprocates due to the application of pulsating fluid is decreased, thereby inhibiting wear on the bore in which the valve reciprocates to inhibit leaking and the resulting malfunction of the converter clutch.

In the factory installed 4T60-E transmission, the PWM pulse signal applied by the solenoid 40 to the valve 36 through the line 38 often do not accurately match engine torque, even if there is no leakage of fluid from the valve 36 as discussed above. In accordance with a further aspect of the present invention, the isolator valve 36 defines a hollow portion for receiving a spring 42 therein. The spring assures sufficient converter apply pressure even when the incremental PWM (pulse width modulation) signals applied to the valve 36 through line 38 are out of synchronization with actual engine torque.

In a further aspect of the present invention, a plug 44 is disposed in line 38 to block fluid flow between the solenoid 40 and the isolator valve 36. A new line 46 is provided to couple the right end of the isolator valve 36 (the end at which PWM signals had previously been received from the solenoid 40) to a modulator circuit designated generally by reference numeral 48 in FIG. 5. Modulator oil pressure increases and decreases in direct proportion to changes in engine torque. As a result of directly coupling the isolator valve to the modulator circuit, lockup pressure is generated which instantly and precisely matches engine torque, thereby eliminating incremental control resulting from the incremental PWM pulse signals which are transmitted from the solenoid 40 to the isolator valve 36 in the factory installed transmission.

As discussed above with respect to the isolator valve 36, the converter regulator valve designated by reference numeral 50, and the TCC converter clutch valve designated by reference numeral 52, are are also susceptible to tipping and misalignment as a result of the constant application of incremental pulses, which causes these valves to continuously oscillate. The constant oscillation of misaligned valves results in accelerated wear of the bores in which the respective valves reciprocate. In a further aspect of the present invention, the converter regulator valve of the factory installed transmission, which has relatively long openings 54 as illustrated by FIG. 7A, is replaced by a converter regulator valve formed from steel and defining circular openings 56 as illustrated by FIG.7B. The openings 56 are defined in grooves 58 between successive adjacent lands 60 so that the openings are recessed relative to the outer surfaces of the lands 60, and the valve is supported at all times by the outer surface of the lands 60. The elimination of the longer openings 54 in the converter regulator valve of the factory installed transmission, and the provision of circular lands 60 for supporting the valve along the entire length of the valve, significantly reduces likelihood that the converter regulator valve will tip or otherwise become misaligned as it reciprocates in its bore.

Referring to FIGS. 5–6, TCC signal oil is supplied to the left side of the converter clutch 52 by a line 62. A TCC filter 64 is disposed in the line 62, and the filter has an orifice (diameter) of 0.039 inches in the factory installed transmission. As a result of constant oscillation of the converter clutch valve 52, the bore in which the valve reciprocates becomes worn, allowing TCC signal oil applied to the left side of the valve by line 62 to leak past the valve and exhaust on the right side of the left most land. This causes the valve to further oscillate, resulting in more wear and diminished lockup function causing misaligned computer commands and overheating which can damage the entire valve body. In accordance with a further aspect of the present invention, the orifice (diameter) of the filter 64 is enlarged to approximately 0.055 inches to increase the flow of fluid applied to the converter clutch 52 to overcome the leakage caused by wear in the valve bore. Additionally, the exhaust passage designated by reference numeral 66 is enlarged from the factory installed diameter of approximately 0.073 inches to approximately 0.093 inches to enable the TCC solenoid 68 to exhaust the increased application of fluid flow in its non-use mode.

Turning now to FIGS. 8A, 8B, 8C and 9, these drawings illustrate the hydraulic circuitry of a factory installed 4L60-E transmission, as modified in accordance with a further aspect of the present invention. In the factory installed transmission, a PWM (pulse width modulator) solenoid is pulsed on an off via computer commands that control the apply rate of a converter clutch by transmitting fluid to a converter regulator valve train for raising or lowering converter apply pressure. The flow rate of the PWM solenoid is controlled by an onboard computer, and the computer is provided to match converter clutch apply pressure to actual engine torque.

In the factory installed transmission, PWM oil is applied to one side of an isolator valve, which is the bottom valve in the converter regulator valve train, and the oil is exhausted on the other side of the valve. The isolator valve in the factory installed transmission has a relatively short length/diameter ratio, approximately 1.3, which causes the valve to tip or misalign when the valve is reciprocating in its bore. Reciprocation of the misaligned valve results in accelerated wear in the bore in which the valve reciprocates, causing PWM oil applied to the isolator valve to leak. As a result of the leakage of the oil, the converter regulator valve train is no longer able to raise converter pressure to match actual engine torque, resulting in malfunction and potential damage to the converter clutch, potentially requiring replacement of the entire valve body.

In accordance with a further aspect of the present invention, the isolator valve of the factory installed transmission is replaced by an isolator valve 70 in which the length/diameter ratio is increased to approximately 2.9. In this manner, tipping or misalignment of the valve as it reciprocates in its bore is significantly reduced or eliminated. Additionally, the isolator valve 70 defines a hollow section 72 and a spring 74 is received in the hollow section. In this manner, the spring assures that sufficient apply pressure will be generated to enable the converter clutch to hold during normal use even if the PWM solenoid or electrical systems fail to properly regulate the converter clutch.

As illustrated by FIGS. 8A, 8B, 8C and 9, the PWM solenoid, designated by reference numeral 76, is coupled to the isolator valve 70 through a line 78. In accordance with a further aspect of the present invention, a plug 80 is disposed in line 78 to block fluid flow between the solenoid 76 and the valve 70. A new line, designated by reference numeral 82, is provided through which torque signal oil is applied to the isolator valve 70. Torque signal oil corresponds to actual engine torque, and the direct application of torque signal oil to the input end of the isolator valve 70 generates pressure which precisely and instantly matches that of engine torque, thereby eliminating the incremental application of fluid pressure from the solenoid 76 to the isolator valve 70 as in the case of the factory installed transmission.

Other modifications within the scope of the present invention will become apparent to those skilled in the art. Accordingly, the above discussion of the preferred embodiments is intended to be illustrative only, and not restrictive of the scope of the invention, that scope being defined by the following claims and all equivalents thereto.

What is claimed is:

1. A method for modifying hydraulic ciruitry of an automotive transmission including a main regulator valve mounted in a bore for reciprocal movement therein, said main regulator valve having a front end and a rear end, said bore defining a first space between said front and rear ends of said main regulator valve in fluid communication with a source of line pressure, said main regulator valve having an end plug disposed forward of said front end of said main regulator valve and mounted over an opened end of said bore, said bore defining a second space between said front end of said main regulator valve and said end plug, the steps of said method including:

controlling the fluid pressure in said bore by coupling said second space in fluid communication with pressure control means to prevent said fluid pressure from exceeding a predetermined value, and replacing said end plug with a multi-component relief valve assembly including a bushing having a hollow portion defined therein.

2. The method as claimed in claim 1 further including the step of inserting a spring in said hollow portion of said bushing.

3. The method as claimed in claim 2 further including the step of providing means for retaining said spring in said hollow portion of said bushing.

4. The method as claimed in claim 3 wherein said step of providing means for retaining includes the step of inserting a pin into an opening in said bushing proximate to an opened end of said hollow portion of said bushing.

5. A method for modifying hydraulic circuitry of an automotive transmission including a main regulator valve mounted in a bore for reciprocal movement therein, said bore defining a space therein in fluid communication with a source of line pressure, said main regulator valve having an end plug mounted over an opened end of said bore, the steps of said method including:

replacing said end plug with a multi-component relief valve assembly including a bushing having a hollow portion defined therein for controlling the fluid pressure in said space defined in said bore to prevent said fluid pressure from exceeding a predetermined value, inserting a spring in said hollow portion of said bushing, and inserting a ball in said hollow portion of said bushing.

6. A method for modifying hydraulic circuitry of an automotive transmission including a main regulator valve mounted in a bore for reciprocal movement therein, said bore defining a space therein in fluid communication with a source of line pressure, said main regulator valve having an end plug mounted over an opened end of said bore, the steps of said method including:

controlling the fluid pressure in said space defined in said bore to prevent said fluid pressure from exceeding a predetermined value by coupling said space defined in said bore in fluid communication with pressure control means by a passageway, and, increasing the diameter of at least one portion of said passageway to permit fluid in said space defined in said bore to exhaust from said space so that fluid pressure in said space does not exceed said predetermined value.

7. The method as claimed in claim 6 wherein said increased diameter portion of said passageway is proximate to the location at which said passageway is coupled to said space in said bore of said main regulator valve.

8. The method as claimed in claim 6 wherein said increased diameter portion of said passageway is proximate to the location at which said passageway is coupled to said pressure control means.

9. A method for modifying hydraulic circuitry of a factory installed transmission having an isolator valve in fluid communication with a PWM (pulse width modulator) solenoid valve, said isolator valve receiving signals from said PWM solenoid valve, the steps of said method including:

blocking fluid flow between said PWM solenoid valve and said isolator valve, and coupling said isolator valve to a source of fluid pressure corresponding to actual engine torque.

10. The method of claim 9 including the step of:

replacing said isolator valve in said factory installed transmission with a replacement isolator valve having a hollow portion, and inserting a spring in said hollow portion of said replacement isolator valve.

11. The method as claimed in claim 10 wherein the step of replacing said isolator valve in said factory installed transmission with said replacement isolator valve includes the step of providing said replacement isolator valve with a length/diameter ratio of at least 2.0.

12. The method as claimed in claim 9 wherein said step of coupling said isolator valve to a source of fluid pressure includes the step of coupling said isolator valve to a modulator circuit.

13. The method as claimed in claim 9 wherein said the step of coupling said isolator valve to a source of fluid pressure includes the step of coupling said isolator valve to a source of torque signal oil.

14. The method as claimed in claim 9 further including the step of increasing the diameter of a filter disposed in a line coupled to a converter valve for increasing fluid pressure applied to said converter valve.

15. The method as claimed in claim 14 further including the step of:

increasing the diameter of an exhaust passage in said converter valve.

16. A method for modifying hydraulic circuitry of a factory installed automatic transmission having a converter regulator valve including at least two lands defining at least one groove therebetween, said groove being formed from a closed surface, the steps of said method including:

replacing said converter regulator valve in said factory installed transmission with a converter regulator valve having at least two lands for supporting said converter regulator valve on the outer surface of said at least two lands and at least one groove defined between said at least two lands, and defining at least one opening in said at least one groove.

17. The method as claimed in claim 16 wherein said opening is substantially circular in configuration.

* * * * *